(12) United States Patent
Maarseveen et al.

(10) Patent No.: US 11,438,299 B2
(45) Date of Patent: Sep. 6, 2022

(54) REDUCING BATTERY IMPACT OF NETWORK DEVICE ARP SPOOFING

(71) Applicant: Avast Software s.r.o., Prague (CZ)

(72) Inventors: Wicher Thomas Maarseveen, Epe (NL); Lukás Karas, Prague (CZ)

(73) Assignee: Avast Software s.r.o., Prague (CZ)

( * ) Notice: Subject to any disclaimer, the term of this patent is extended or adjusted under 35 U.S.C. 154(b) by 174 days.

(21) Appl. No.: 16/736,492

(22) Filed: Jan. 7, 2020

(65) Prior Publication Data

US 2021/0211402 A1 Jul. 8, 2021

(51) Int. Cl.
| H04L 61/103 | (2022.01) |
| H04L 9/40 | (2022.01) |
| H04L 61/2514 | (2022.01) |
| H04L 61/5014 | (2022.01) |

(52) U.S. Cl.
CPC ........ H04L 61/103 (2013.01); H04L 61/2514 (2013.01); H04L 61/5014 (2022.05); H04L 63/0272 (2013.01); H04L 63/20 (2013.01)

(58) Field of Classification Search
CPC ............... H04L 61/103; H04L 61/2015; H04L 61/2514; H04L 63/0272; H04L 63/20
See application file for complete search history.

(56) References Cited

U.S. PATENT DOCUMENTS

| 9,634,896 | B2 | 4/2017 | Zhang et al. |
| 2006/0050703 | A1 | 3/2006 | Foss |
| 2009/0307371 | A1* | 12/2009 | Okazaki ................ H04L 61/103 709/233 |
| 2012/0213094 | A1* | 8/2012 | Zhang ..................... H04L 43/12 370/252 |
| 2015/0121529 | A1* | 4/2015 | Quinlan ............. H04W 12/128 726/23 |

\* cited by examiner

*Primary Examiner* — Samina F Choudhry
(74) *Attorney, Agent, or Firm* — Avek IP, LLC; William B. Kircher (57) ABSTRACT

A private network device such as a security device is inserted in a private network using ARP spoofing, which includes sending periodic ARP packets from the private network device to a router and to client devices to ensure the private network device spoofing remains intact. The private network device determines when at least one of the one or more private network devices is inactive, such as by monitoring the network for activity between the devices and a router, and suspends sending the periodic ARP packets to the client devices when they are inactive.

16 Claims, 3 Drawing Sheets

FIG. 3

REDUCING BATTERY IMPACT OF NETWORK DEVICE ARP SPOOFING

FIELD

The invention relates generally to managing security in a private network, and more specifically to reducing the battery impact on battery powered devices from Address Resolution Protocol (ARP) spoofing in a network device such as a network security device.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, website scanning tools are used to verify the security and integrity of a website, and to identify and fix potential vulnerabilities.

For example, a firewall in a home or office may restrict the types of connection and the data that can be transferred between the internal network and an external or public network such as the Internet, based on firewall rules and characteristics of known malicious data. The firewall is typically a computerized network device that inspects network traffic that passes through it, permitting passage of desirable network traffic while blocking undesired network traffic based on a set of rules. A firewall or similar network security device may be integrated into a home or small business router, or may be a standalone device such as a device connected to a router and configured to filter traffic between a public network and devices on a private network.

In a more detailed example of a standalone security device not integrated within a router, the network security device is coupled to the router via a network connection and is configured to receive or intercept data sent between external computer systems and devices on the internal private network. This is achieved in one example by using Address Resolution Protocol (ARP) spoofing, by which the security device associates its own MAC address with the IP address of a different device that is a target of communication. The security device can then intercept the network data and screen it before forwarding it to the intended destination, such as an internal private network device. In other examples, other methods are similarly used to configure the security device between the external network and internal or private network devices.

But, such solutions can be difficult to implement, as the network protocols are being used in a way that is not intended to perform ARP spoofing. Further, ARP spoofing involves repeatedly sending ARP packets from the security device to ensure it remains configured between the private network devices and the router, which may cause unintended consequences. It is therefore desirable to manage application of ARP spoofing as a security solution to provide greater security to devices on a protected network.

SUMMARY

In one example embodiment, a private network device such as a security device is inserted in a private network using ARP spoofing, which includes sending periodic ARP packets from the private network device to client devices to ensure the private network device spoofing remains intact. The private network device determines when at least one of the one or more private network devices is inactive, such as by monitoring the network for activity to and/or from the devices, and suspends sending the periodic ARP packets to the client devices when they are inactive.

The details of one or more examples of the invention are set forth in the accompanying drawings and the description below. Other features and advantages will be apparent from the description and drawings, and from the claims.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common documents are all frequently infected with malware of various types, and so users rely on tools such as antivirus software or other malware protection tools to protect their computerized devices from harm.

An increasing number of computerized devices such as home appliances, vehicles, and other devices (known collectively as the Internet of Things, or IoT) are connected to public networks and are also susceptible to unauthorized interception or modification of data. For example, many popular security cameras are known to have vulnerabilities through which attackers can access the device without authorization, enabling the attackers to view and record image data from the cameras or to control camera operation. Similar vulnerabilities are known to exist or may exist in other IoT devices, including network-connected home security systems such as electronic locks, home appliances such as smart thermostats or kitchen appliances, and vehicles with network access.

In a typical home computer or corporate environment, firewalls inspect and restrict the types of communication that can occur between local devices such as computers or IoT devices and the Internet, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes.

A firewall or similar network security device in a home or office may be integrated into a router, or may be a standalone device such as a device connected to a router and configured to filter traffic exchanged between a public network and devices on a private network before forwarding such traffic between the public and private networks. In a more detailed example of a standalone security device, the device is coupled to a router via a network connection and is configured to receive or intercept data sent between external computer systems and devices on the internal private network, such as by Address Resolution Protocol (ARP) spoofing, Dynamic Host Configuration Protocol (DHCP) settings, Neighborhood Discovery Protocol spoofing for IPv6, or another suitable method.

In ARP spoofing, the security device associates its own MAC addresses with the IP addresses of the network's router and at least one device on the private network to be protected by the security device, such that a substitute MAC address of the network security device is associated with the protected device's IP address rather than the protected device's own MAC address. The security device achieves this in a more detailed example by sending ARP packets across the internal network that contain the security device's MAC address and the protected device's IP address, such that other devices on the network such as the router and switches will cache the MAC address of the security device as being associated with the protected device's IP address. Network data on the internal network destined for the protected device will therefore instead be routed to the security device, which can screen it before forwarding it to the protected device on the private network. This process is repeated for other devices on the private network to be protected.

In a further example, a similar process is also performed for the router such that the outbound traffic from local network devices destined for the router is also filtered by the security device. In one such example, network traffic from private network devices destined for the router's IP address are routed to the security device via a spoofed MAC address associated with the router's IP address, distributed by ARP packets as described above.

But, such systems rely upon using the Address Resolution Protocol (ARP) in a way it was not designed to be used, and some devices may not respond to the ARP spoofing process as hoped. For example, if a client device is actively communicating with the router while ARP spoofing is attempted, a data stream between the router and client device may interfere with successful ARP spoofing. In another example, a device that infrequently connects to the private network or that is new to the network may miss the ARP spoofing attempt, and so communicate directly with the router or gateway device. For reasons such as this, ARP packets are frequently sent from the network security device, ensuring that the network security device remains configured to intercept traffic between the router and private network devices.

But, the network security device's frequent broadcasting of ARP packets also results in an increase in network traffic to private network devices, including battery powered devices that may otherwise become inactive and enter a sleep state. Because the ARP packets from the network security device keep some battery powered devices from entering a sleep (or low power) state, the devices consume significantly more power than they would otherwise consume and battery life of the devices is negatively impacted.

Some example embodiments described herein therefore seek to send ARP packets to at least those private network devices believed to be battery powered when such devices are active, and suspend sending ARP packets to these devices when they are otherwise in an inactive state. In a more detailed example, a private network device such as a security device is inserted in a private network using ARP spoofing, which includes sending periodic ARP packets from the private network device to client devices to ensure the private network device spoofing remains intact. The private network device determines when at least one of the one or more private network devices is inactive, such as by monitoring the network for activity from the devices, and suspends sending the periodic ARP packets to the client devices when they are inactive.

In a further example, the private network device continues to send ARP packets to the router or gateway when one or more private devices becomes inactive, ensuring that the spoofing remains intact for active devices on the network. In another example, the private network device monitors the network for ARP packets from other devices such as the router/gateway or client devices, and reinserts itself between the router/gateway and the client devices using ARP spoofing in response to detecting the ARP packet from another device. The ARP spoofing packets sent in response are in some further examples delayed and/or repeated over a brief time to ensure successful ARP spoofing and reinsertion of the private network device.

Figure 1:
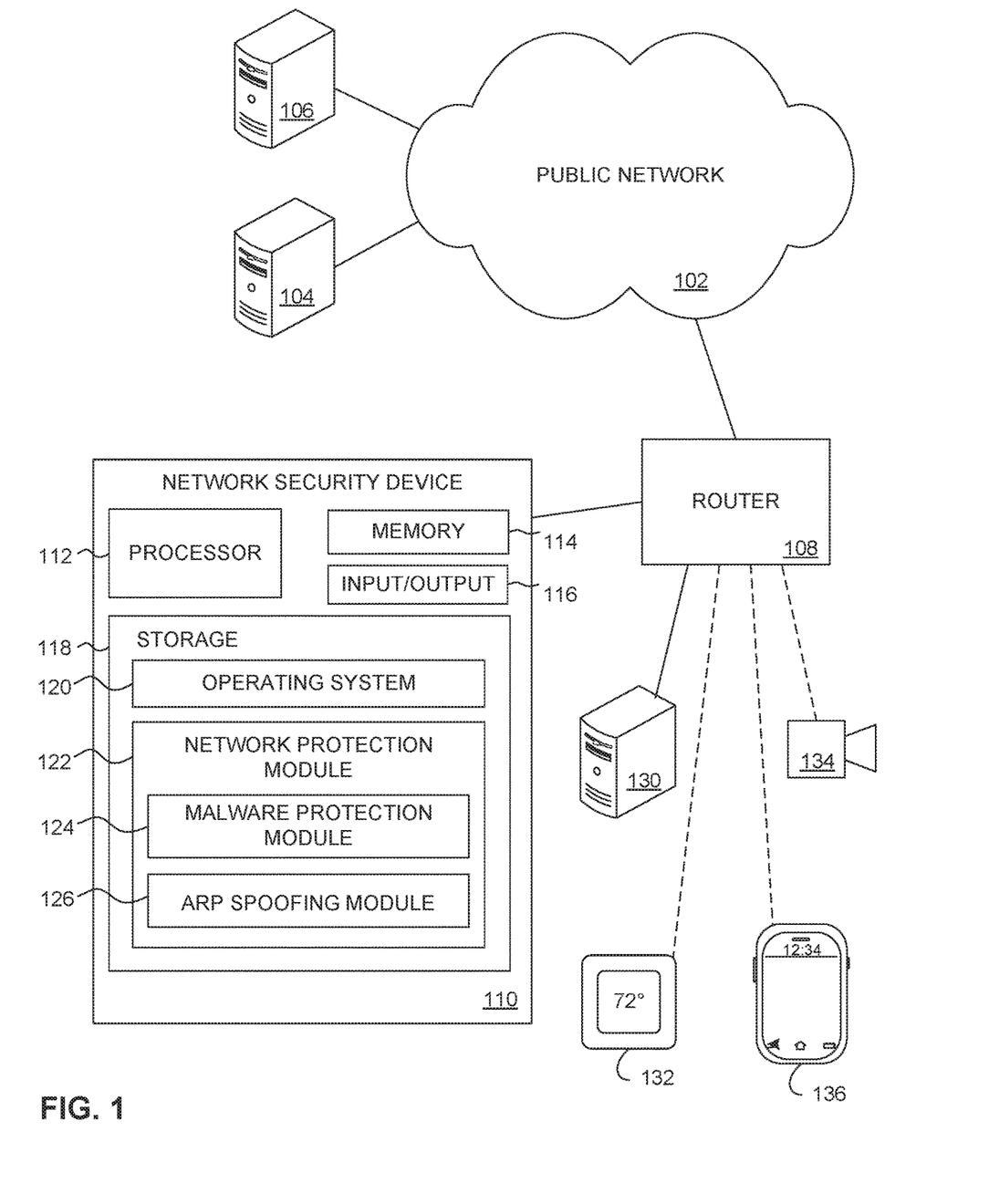
FIG. 1 shows a private network with a network security device configured to perform ARP spoofing, consistent with an example embodiment.

FIG. 1 shows a private network with a network security device configured to perform ARP spoofing, consistent with an example embodiment. Here a public network 102 links remote computer systems such as servers 104 and 106 to a private local network via router 108. The private network in this example includes network security device 110, which includes a processor 112, memory 114, input/output 116 (such as a network interface), and storage 118. The storage stores instructions executable on processor 112 to perform certain functions, including operating system 120 and network protection module 122.

The network protection module includes a malware protection module 124 which is operable to inspect traffic between one or more private network devices and the public network 102 for malicious content, as well as ARP spoofing module 126 operable to spoof the IP addresses of the router or gateway and the client devices to insert itself between the devices on the network.

The private network also includes one or more client devices, such as computer 130, smart thermostat 132, camera 134, and smartphone 136. The network security device in this example is configured to protect the private network devices from threats such as an outside attacker or other such threats coming from the public network 102 to the private network via the router or gateway 108.

In operation, the various devices on the private network, such as computer 130, smart thermostat 132, camera 134, and smartphone 136, are configured to exchange data with one or more computerized devices on the public network, such as servers 104 and 106. For example, computer 130 and smartphone 136 may load web pages and emails from public network servers, while smart thermostat 132 and camera 134 send data regarding their operation to servers configured to facilitate control and storage of HVAC and captured video data.

Each of these private network devices is operable to exchange data with other computerized devices, including those on the public network, they are vulnerable to the data being intercepted and tampered with or to being attacked with various types of malicious software or malware. For example, an attacker may target computer 130 with viruses that infect the computer and perform functions such as mine cryptocurrency, send spam emails, encrypt files that are held ransom for payment (ransomware), or other such malicious activity. Smart thermostat 132 may have its heating and cooling settings tampered with, or may have other features such as an interactive voice service such as Alexa® tampered with to enable eavesdropping or other malicious activity. Similarly, camera 134 may be hacked such that an attacker or another remote user on the public network 102 can monitor activity visible to the camera or use other functions such as a speaker to interact with people local to the camera.

The private network devices 130-136 communicate with devices on the public network 102 via router 108, which directs traffic from the private network devices 130-136 to the public network and from the public network to the intended private network devices. In the example of FIG. 1, the network security device 110 will employ its ARP spoofing module 126 to selectively "spoof" or take the place of the router to the private network client devices 130-136, and will "spoof" or take the place of one or more of the private network devices 130-136 to the router 108 and devices on the public network 102. The malware protection module 124 is then operable to screen or filter network traffic between the private network devices 130-136 and the public network, such as to block known or suspected malware or other security threats in network traffic from the public network to the private network devices.

In a more detailed example of ARP spoofing, the network security device 110 provides protection to private network devices 130-136 by taking advantage of network protocols for establishing network address records to insert itself between communicating network devices. A new device attached to a private network is typically assigned an IP address using the Dynamic Host Configuration Protocol, or DHCP, via a DHCP server (such as router 108) that is responsible for ensuring each device on the private network has a unique IP address. The new device broadcasts a DHCP discovery request on the private network, and one or more DHCP servers receive the request and reserve an IP address which is then offered to the new device. The new device replies with a DHCP request accepting the reserved IP address from a DHCP server (accepting only a single offer if multiple IP address offers are received), which the DHCP server then acknowledges. The router then sends an Address Resolution Protocol (ARP) request across the network, ensuring the new device is the only device on the private network using the assigned IP address.

When the new device wishes to communicate with another device on the network, it broadcasts an ARP request packet with the intended destination's IP address. The intended destination computer responds with its MAC address, which the new device and any other listening devices then store in an ARP table associated with the intended destination's IP address for future use. The new device can now use the intended destination's MAC address to communicate with the intended destination device.

The network security device 110 of FIG. 1 in some examples uses ARP spoofing to "spoof" or take the place of the router to one or more of the local network devices 130-136, and to selectively "spoof" or take the place of one or more of the local network devices 130-136 to the router 108. In both cases, the network security device forwards data received as a result of such "spoofing" to the intended destination after screening the data, enabling the network security device 110 to monitor and restrict communication between local devices 130-136 and the router (including traffic between local devices 130-136 and the public network via the router). ARP spoofing is achieved in a more detailed example by sending an ARP unicast, announcement broadcast, or other ARP packets to other devices on the private network that falsely updates IP to MAC address mapping in private network devices so that data intended for select devices instead is routed to the network security device's MAC address, enabling network security device to insert itself as "man-in-the-middle" between select private network devices 130-136 and the router.

In the example of FIG. 1, some client devices such as 130-136 may not successfully respond to the network security device 110's ARP spoofing attempt, and so may remain directly connected to the router 108. This can happen for a variety of reasons, such as multiple or conflicting MAC addresses being cached for the same IP in a client device, devices rebroadcasting ARP packets after the network security device has inserted itself in the network (thereby undoing the spoofing), or devices that may connect to the private network only intermittently such as video camera 134 being in an inactive state or smart phone 136 being away from home when an ARP spoofing attempt takes place. For this reason, ARP packets are sent periodically from the network security device 110 to ensure that it remains inserted in the private network, such that traffic between the client devices 130-136 and the router 108 continues to be directed through the network security device for screening and/or filtering.

But, some devices such as smartphone 136 may be used only intermittently, and will enter a low power or sleep state when they are not being actively used to preserve battery life. Some Internet of Things (IoT) devices such as security camera 134 and smart thermostat 132 may also be battery powered in certain embodiments, and similarly enter low power, sleep, or other reduced function states to preserve battery life when they are not being actively used. If these devices receive periodic ARP packets from a device such as network security device 110 that is attempting to remain inserted in the private network, this may prevent some such client devices from entering a low power or sleep state, and will significantly reduce the battery life of these devices.

The ARP spoofing module 126 of the network security device 110 in this example is therefore configured to monitor the private network for activity from client devices 130-136, and to determine when a device has become inactive. If a client device is determined to be inactive such as due to not generating network traffic for a period of time, the ARP spoofing module 126 suspends sending ARP packets to the device, allowing the device to enter a low power or sleep state and preserve battery life. In a further example, if the device does not become active within a certain time period after becoming inactive, it is removed from a network security device database of tracked network client devices for which ARP spoofing is maintained.

In a more detailed example, the network security device's ARP spoofing module monitors the network for certain types of traffic originating from the router that have been protected by inserting the network device between the client device and router/gateway 108 using ARP spoofing. In another example, both traffic from the router to the client device and traffic from the client device to the router are monitored. Examples of traffic that may indicate the client device is awake and active include DHCP, IP broadcast, and IP unicast packets from the client to the router or from the router to the client, ICMP messages, ARP broadcast queries or replies, and ARP unicast queries or replies. Each time such network traffic is seen from one of the client devices being protected through ARP spoofing, a timer for the client device sending the network traffic is reset. When the timer expires with no network traffic observed, the device is deemed to be inactive, and ARP spoofing the device is no longer actively maintained by sending periodic ARP packets to the device until new network traffic from the client device is observed.

In a further example, ARP spoofing is continued for other client devices, and for the router/gateway 108, when spoofing is suspended for inactive clients. If the inactive client wakes up and begins communicating, the network security device may no longer be spoofed as the router/gateway to the newly active client device, as it has not received periodic ARP spoofing update packets due to its inactive state. The network security device is therefore further operable in some embodiments to detect traffic from the gateway to the inactive client device (as the network security device is still spoofing the inactive client device's IP address to the router/gateway), and to resume ARP spoofing the inactive client device when such traffic is detected.

If an ARP packet is sent from an ARP spoofed client device or the router/gateway, the network security device is also at risk of being removed from its spoofed logical network position between the router/gateway and the client devices, and so sends its own ARP packets to each device in its active device database. In a more detailed example, this includes client devices that are active, but not client devices that have been determined to be inactive or that have been removed from the active device database due to an extended period of inactivity.

ARP spoofing the router/gateway in a more detailed example comprises sending multiple unicast ARP request packets from the network security device to the router. Multiple ARP request packets are sent instead of ARP reply packets to avoid interfering with the router's DHCP server's assignment of IP addresses to devices on the private network. Because DHCP servers often use broadcast ARP requests to ensure an IP address is available before assigning it to a new network device, sending an ARP reply from the network security device as part of spoofing the router/gateway could cause the DHCP server to falsely assume that the IP address is in use.

If an ARP packet is broadcast from a client device, the router/gateway will receive the ARP packet and become unspoofed. The network security device therefore monitors spoofed client devices for ARP packets, and sends a batch of ARP packets to the router for the device that has sent its own ARP packets in response. In a more detailed example, the network security device delays sending the ARP packets for a period such as several milliseconds to several seconds to ensure that the client device's ARP packet exchange is complete before it re-spoofs the client device by sending its own ARP packets. In some such embodiments, multiple ARP packets are sent at different times from the network security device, reducing the chances of the unspoofed client device communicating a significant amount of network traffic directly with the router/gateway rather than through the network security device.

Although the examples presented here use ARP spoofing as it is commonly known in the Internet Protocol version 4 (IPv4) address space, the same or substantially similar spoofing may be performed in the Internet Protocol version 6 (IPv6) address space, such as spoofing using IPv6's Neighborhood Discovery Protocol, or NDP. For purposes of these examples and the appended claims, ARP spoofing includes spoofing using NDP or other corresponding or substantially similar network protocols.

Figure 2:
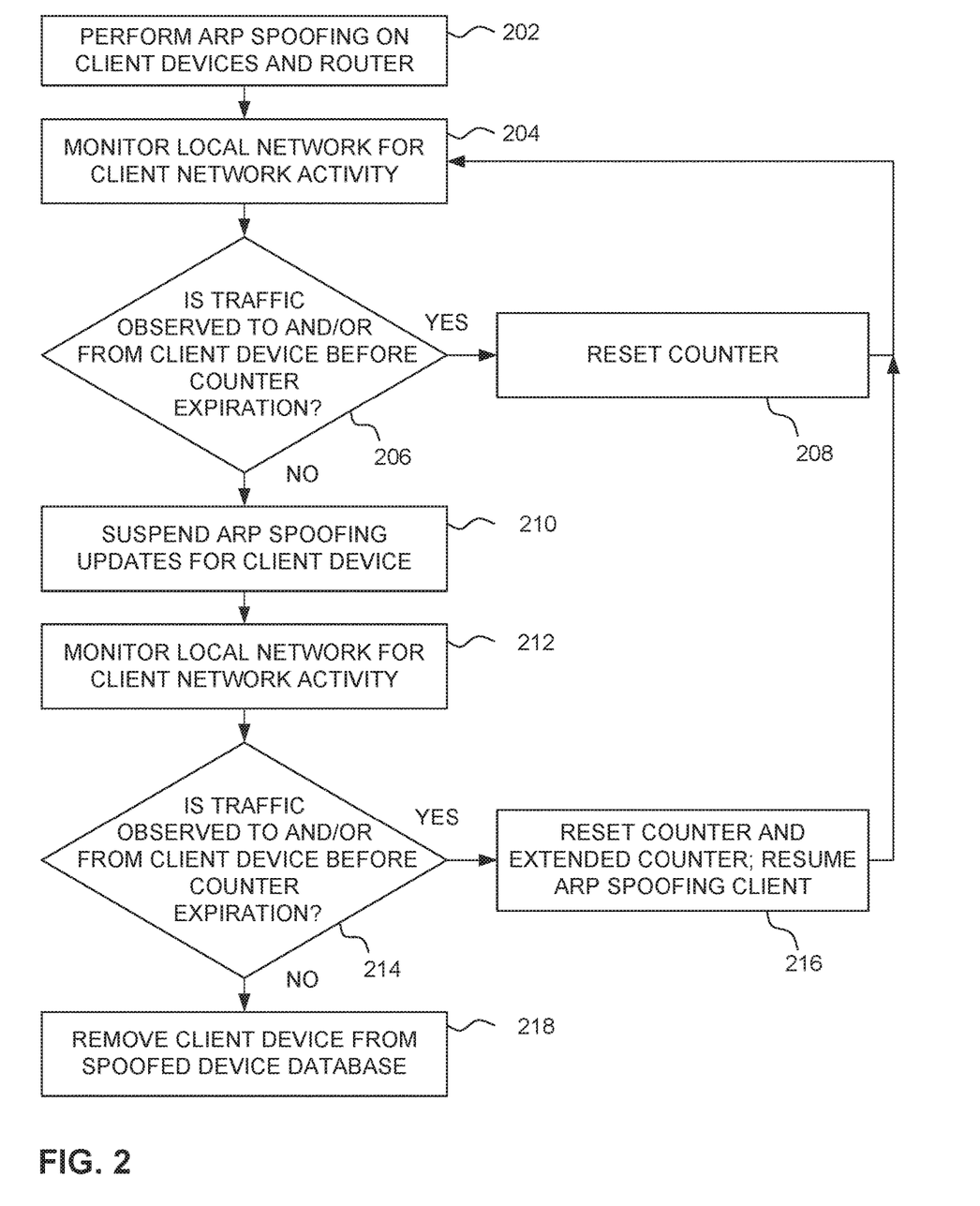
FIG. 2 is a flowchart of a method of suspending ARP spoofing for inactive client devices, consistent with an example embodiment.

FIG. 2 is a flowchart of a method of suspending ARP spoofing for inactive client devices, consistent with an example embodiment. First, the network security device performs ARP spoofing on one or more client devices and on a router in a private network, effectively telling the router to send information destined for the client devices to the network security device and telling the client devices to send information destined for the router to the network security device. The security device is then operable to inspect and selectively filter network traffic between the client devices and the router, providing security functions to the client devices.

The security device additionally monitors the local network for activity from the client devices at 204, and determines at 206 whether traffic from a client device has been received before expiration of a counter. In a more detailed example, a counter is established for each client device recognized on the local network for which the network security device provides protection via ARP spoofing. In an alternate example, both traffic to and from the client is monitored at 204 and 206, such that a client receiving traffic from the router is determined to still be active. The timer is reset each time the device is observed sending qualifying network traffic, such that the counter only expires if no qualifying network traffic from the client device has been observed since the timer was last reset. The network security device therefore resets the counter at 208 if qualifying traffic has been received from the client device before expiration of the counter, and continues to monitor the local network for client network activity at 204.

If qualifying traffic is not received from a client device before expiration of its counter, the network security device suspends ARP spoofing updates for the client device at 210. By stopping ARP spoofing updates, or the periodic re-sending of ARP packets to the inactive client, the network security device avoids preventing the client device from entering a sleep or inactive state due to periodic network activity. The client device is therefore able to sleep or enter another inactive state that preserves its battery life after the network device suspends periodic ARP spoofing updates for the client device at 210.

In a further example, the network security device continues at 212 to monitor the local network for network activity from the client device even once the counter expired at 206 and ARP spoofing updates for the client device were suspended at 210, to reinstate ARP spoofing should the client device wake or enter an active state and resume qualifying network activity. This is reflected at 214, where the network security device determines whether traffic is received from the client device before an extended counter expires, such that the client is removed from a spoofed device database at 218 if qualifying traffic is not received from the client device before the extended counter expires. If the security device receives qualifying traffic from the client device before expiration of the extended counter, the extended counter is reset at 216, spoofing the client device resumes, and the local network is monitored for client network activity at 204 to detect a possible new sleep or other inactive mode in the client device. In a further example, the monitoring at 212 and 214 also looks for traffic from the router to the client, which when detected similarly results in reinstating ARP spoofing of the client device and resetting the extended counter.

This process enables the network security device to selectively send periodic ARP spoofing packets to client devices that have been previously spoofed to ensure they remain spoofed and thereby protected by the network security device, while suspending the periodic ARP packets to client devices that have become inactive. This is achieved in a more detailed example by monitoring network traffic to determine whether a client device is active or inactive, such that the client device is deemed inactive if qualifying network traffic to or from the client device is not observed during a threshold time. Suspending ARP spoofing packets to the inactive client device allows the client device to enter a sleep or other reduced power mode, thereby conserving battery power on the client device.

Figure 3:
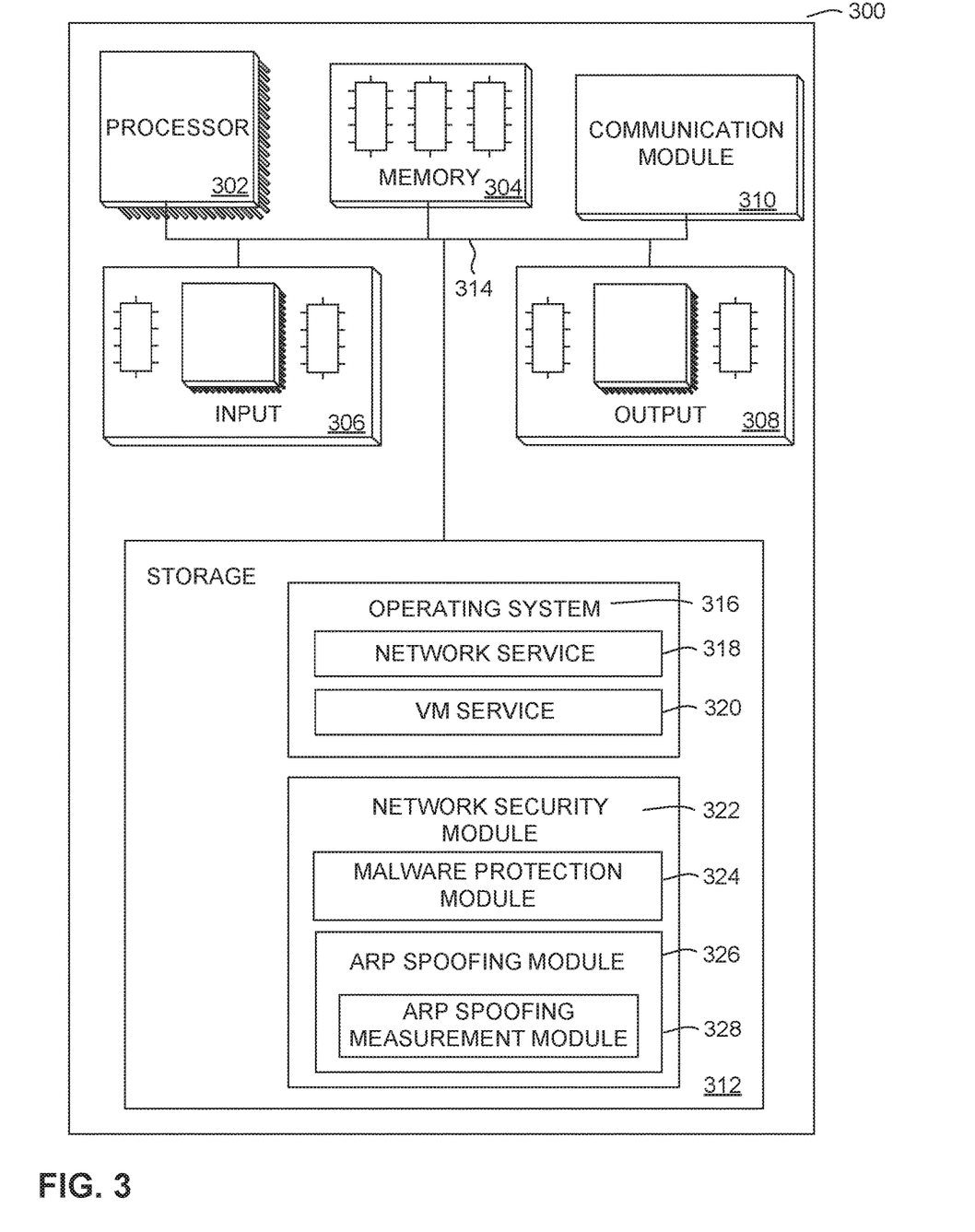
FIG. 3 is a computerized network security device, consistent with an example embodiment of the invention.

Although the network security device, client device, and other computerized devices are shown in various examples presented herein, in other embodiments they will have fewer, more, and/or other components or features, such as those described in FIG. 3. FIG. 3 is a computerized network security device, consistent with an example embodiment of the invention. FIG. 3 illustrates only one particular example of network security device 300, and other computing devices may be used in other embodiments. Although network security device 300 is shown as a standalone computing device, device 300 may be any component or system that includes one or more processors or another suitable computing environment for executing software instructions in other examples, and need not include all of the elements shown here.

As shown in the specific example of FIG. 3, network security device 300 includes one or more processors 302, memory 304, one or more input devices 306, one or more output devices 308, one or more communication modules 310, and one or more storage devices 312. Device 300 in one example further includes an operating system 316 executable by network security device 300. The operating system includes in various examples services such as a network service 318 and a virtual machine service 320 such as a virtual server or various modules described herein. One or more applications, such as network protection module 322 are also stored on storage device 312, and are executable by network security device 300.

Each of components 302, 304, 306, 308, 310, and 312 may be interconnected (physically, communicatively, and/or operatively) for inter-component communications, such as via one or more communications channels 314. In some examples, communication channels 314 include a system bus, network connection, inter-processor communication network, or any other channel for communicating data. Applications such as network security module 322 and operating system 316 may also communicate information with one another as well as with other components in device 300.

Processors 302, in one example, are configured to implement functionality and/or process instructions for execution within computing device 300. For example, processors 302 may be capable of processing instructions stored in storage device 312 or memory 304. Examples of processors 302 include any one or more of a microprocessor, a controller, a digital signal processor (DSP), an application specific integrated circuit (ASIC), a field-programmable gate array (FPGA), or similar discrete or integrated logic circuitry.

One or more storage devices 312 may be configured to store information within network security device 300 during operation. Storage device 312, in some examples, is known as a computer-readable storage medium. In some examples, storage device 312 comprises temporary memory, meaning that a primary purpose of storage device 312 is not long-term storage. Storage device 312 in some examples is a volatile memory, meaning that storage device 312 does not maintain stored contents when network security device 300 is turned off. In other examples, data is loaded from storage device 312 into memory 304 during operation. Examples of volatile memories include random access memories (RAM), dynamic random access memories (DRAM), static random access memories (SRAM), and other forms of volatile memories known in the art. In some examples, storage device 312 is used to store program instructions for execution by processors 302. Storage device 312 and memory 304, in various examples, are used by software or applications running on network security device 300 such as network security module 322 to temporarily store information during program execution.

Storage device 312, in some examples, includes one or more computer-readable storage media that may be configured to store larger amounts of information than volatile memory. Storage device 312 may further be configured for long-term storage of information. In some examples, storage devices 312 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Network security device 300, in some examples, also includes one or more communication modules 310. Computing device 300 in one example uses communication module 310 to communicate with external devices via one or more networks, such as one or more wireless networks. Communication module 310 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, network security device 300 uses communication module 310 to communicate with an external device such as via public network 102 of FIG. 1.

Network security device 300 also includes in one example one or more input devices 306. Input device 306, in some examples, is configured to receive input from a user through tactile, audio, or video input. Examples of input device 306 include a touchscreen display, a mouse, a keyboard, a voice-responsive system, a video camera, a microphone, or any other type of device for detecting input from a user.

One or more output devices 308 may also be included in computing device 300. Output device 308, in some examples, is configured to provide output to a user using tactile, audio, or video stimuli. Output device 308, in one example, includes a display, a sound card, a video graphics adapter card, or any other type of device for converting a signal into an appropriate form understandable to humans or machines. Additional examples of output device 308 include a speaker, a light-emitting diode (LED) display, a liquid crystal display (LCD), or any other type of device that can generate output to a user.

Network security device 300 may include operating system 316. Operating system 316, in some examples, controls the operation of components of network security device 300, and provides an interface from various applications such as network security module 322 to components of network security device 300. For example, operating system 316, in one example, facilitates the communication of various applications such as network security module 322 with processors 302, communication module 310, storage device 312, input device 306, and output device 308. Applications such as network protection module 322 may include program instructions and/or data that are executable by computing device 300. As one example, network security module 322 provides protection from malware and other threats using malware protection module 324, and performs ARP spoofing to insert itself between protected client devices and a router or gateway via ARP spoofing module 326. The success of ARP spoofing is determined by ARP spoofing measurement module 328. These and other program instructions or modules may include instructions that cause network security device 300 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of managing Address Resolution Protocol (ARP) spoofing to reduce battery power consumption in a private network client device, comprising:

inserting the private network device between a router or gateway and one or more private network client devices in a private network by using Address Resolution Protocol (ARP) spoofing;

sending periodic ARP packets from the private network device to at least one of the one or more private network client devices to ensure the private network device remains inserted;

determining when at least one of the one or more private network devices is inactive, wherein determining when at least one of the one or more private network devices is inactive comprises determining whether the at least one device has sent traffic to the router or received traffic from the router during a threshold time for the at least one device, wherein the threshold time is dependent on the type of traffic sent or received; and suspending the sending of periodic ARP packets to at least one of the one or more private network devices when the at least one private network device is determined to be inactive.

2. The method of managing ARP spoofing to reduce battery power consumption in a private network client device of claim 1, where inserting the private network device between a router or gateway and one or more private network client devices comprises sending an ARP packet to the router or gateway and the one or more private network client devices.

3. The method of managing ARP spoofing to reduce battery power consumption in a private network client device of claim 1, wherein the traffic types comprise one or more of DHCP, IP broadcast, and IP unicast packets from either the client to the router or from the router to the client, and ARP broadcast queries.

4. The method of managing ARP spoofing to reduce battery power consumption in a private network client device of claim 1, further comprising periodically sending ARP packets to the router or gateway when sending of periodic ARP packets to at least one of the one or more private network devices has been suspended.

5. The method of managing ARP spoofing to reduce battery power consumption in a private network client device of claim 1, further comprising removing the one or more private network devices from a network device list after a period of inactivity.

6. The method of managing ARP spoofing to reduce battery power consumption in a private network client device of claim 1, further comprising monitoring the private network for ARP packets from the one or more private network devices, and reinserting the private network device between the router or gateway and the one or more private network client devices using ARP spoofing in response to discovering an ARP packet from the router or gateway or one or more private network devices.

7. The method of managing ARP spoofing to reduce battery power consumption in a private network client device of claim 1, wherein reinserting the private network device between the router or gateway and the one or more private network client devices using ARP spoofing in response to discovering an ARP packet from the router or gateway or one or more private network devices comprises delaying at least ten milliseconds between discovering an ARP packet from the router or gateway or one or more private network devices and sending ARP packets to reinsert the private network device between the router or gateway and the one or more private network client devices.

8. The method of managing ARP spoofing to reduce battery power consumption in a private network client device of claim 1, wherein reinserting the private network device between the router or gateway and the one or more private network client devices using ARP spoofing in response to discovering an ARP packet from the router or gateway or one or more private network devices comprises sending ARP packets to reinsert the private network device between the router or gateway and the one or more private network client devices multiple times over the first five seconds after discovering the ARP packet from the router or gateway or one or more private network devices.

9. A network security device, comprising:
a processor and a memory;
a malware protection module operable when executed on the processor to detect a threat to one or more private network devices and take one or more actions in response to detecting the threat; and
an Address Resolution Protocol (ARP) spoofing module operable when executed on the processor to insert the network security device between a router or gateway and the one or more private network clients by using ARP spoofing, to send periodic ARP packets from the private network device to at least one of the one or more private network client devices to ensure the private network device remains inserted, to determine when at least one of the one or more private network devices is inactive, wherein determining when at least one of the one or more private network devices is inactive comprises determining whether the at least one device has sent qualifying traffic to the router or received qualifying traffic from the router during a threshold time for the at least one device, wherein the threshold time is dependent on the type of traffic sent or received, and to suspend the sending of periodic ARP packets to at least one of the one or more private network devices when the at least one private network device is determined to be inactive.

10. The network security device of claim 9, where inserting the private network device between a router or gateway and one or more private network client devices comprises sending an ARP packet to the router or gateway and the one or more private network client devices.

11. The network security device of claim 9, wherein the traffic types comprise one or more of DHCP, IP broadcast, and IP unicast packets from either the client to the router or from the router to the client, and ARP broadcast queries.

12. The network security device of claim 9, the ARP spoofing module further operable to periodically sending ARP packets to the router or gateway when sending of periodic ARP packets to at least one of the one or more private network devices has been suspended.

13. The network security device of claim 9, the ARP spoofing module further operable to remove the one or more private network devices from a network device list after a period of inactivity.

14. The network security device of claim 9, the ARP spoofing module further operable to monitor the private network for ARP packets to and/or from the one or more private network devices, and to reinsert the private network device between the router or gateway and the one or more private network client devices using ARP spoofing in response to discovering an ARP packet from the router or gateway or one or more private network devices.

15. The network security device of claim 9, wherein reinserting the private network device between the router or gateway and the one or more private network client devices using ARP spoofing in response to discovering an ARP packet from the router or gateway or one or more private network devices comprises delaying at least ten milliseconds between discovering an ARP broadcast packet from the router or gateway or one or more private network devices and sending ARP packets to reinsert the private network device between the router or gateway and the one or more private network client devices.

16. The network security device of claim 9, wherein reinserting the private network device between the router or gateway and the one or more private network client devices using ARP spoofing in response to discovering an ARP packet from the router or gateway or one or more private network devices comprises sending ARP packets to reinsert the private network device between the router or gateway and the one or more private network client devices multiple times over the first five seconds after discovering the ARP packet from the router or gateway or one or more private network devices.

* * * * *